(12) United States Patent
Kang

(10) Patent No.: US 6,831,788 B2
(45) Date of Patent: Dec. 14, 2004

(54) POLARIZATION BEAM SPLITTER AND PROJECTION DISPLAY APPARATUS USING THE SAME

(75) Inventor: Ho Joong Kang, Eujeongboo-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/342,234

(22) Filed: Jan. 15, 2003

(65) Prior Publication Data

US 2003/0137743 A1 Jul. 24, 2003

(30) Foreign Application Priority Data

Jan. 18, 2002 (KR) ................................ 10-2002-0003128

(51) Int. Cl.[7] .............................................. G02B 27/14
(52) U.S. Cl. ....................... 359/629; 359/634; 349/9
(58) Field of Search ................................ 359/618, 629, 359/634; 349/8, 9; 353/33

(56) References Cited

U.S. PATENT DOCUMENTS 6,288,844 B1 * 9/2001 Edlinger et al. ............ 359/634
6,348,996 B1 * 2/2002 Itoh ........................... 359/487
6,530,663 B2 * 3/2003 Lin ............................. 353/33
2002/0131027 A1 * 9/2002 Takezawa et al. .......... 353/122

* cited by examiner

*Primary Examiner*—Huy Mai
(74) *Attorney, Agent, or Firm*—Birch, Stewart, Kolasch & Birch, LLP

(57) ABSTRACT

There is provided a projection display apparatus using a polarization beam splitter having two splitting surfaces, which can simplify its structure and reduce its cost. The projection display apparatus includes the polarization beam splitter that has a first splitting surface for transmitting or reflecting a red light and a second splitting surface for transmitting or reflecting a green light and a blue light. A polarization state converter that is provided in the polarization beam splitter converts the polarization states of the green and blue lights and applies the converted green and blue lights to the polarization beam splitter.

17 Claims, 7 Drawing Sheets

POLARIZATION BEAM SPLITTER AND PROJECTION DISPLAY APPARATUS USING THE SAME

This nonprovisional application claims priority under 35 U.S.C. § 119(a) on patent application Ser. No. 2002-0003128 filed in KOREA on Jan. 18, 2002, which is herein incorporated by reference.

BACKGROUND OF THE INVENTION

1. Field of the Invention

The present invention relates to a projection display apparatus, and more particularly, to a projection display apparatus capable of simplifying a structure of an optical system and reducing costs by using a polarization beam splitter having two splitting surfaces.

2. Discussion of the Related Art

As displays are large-sized, development of data projector, projection TV, projection monitor and the like, which use projection techniques, is being accelerated. In addition, recently, reflective liquid crystal panels have been applied to projection-type liquid crystal projectors. The reflective liquid crystal panels are display panels which can improve an aspect ratio by forming reflective electrodes on pixels. Since these reflective liquid crystal panels can increase the aspect ratio much more than the conventional transmissive liquid crystal panels, it is possible to implement projectors which are downsized and have high efficiency.

In general, projectors can be divided into a lighting system, a color separation/synthesis system and a projection system. In the projectors, if the reflective LCD is used as an imager, polarized light should be irradiated into the imager so as to change a traveling path between the lighting system and the projection system.

FIG. 1 is a view of a conventional three-plate transmissive projector. Referring to FIG. 1, the conventional three-plate transmissive projector includes: a light source 110 for applying non-polarized lights; a polarizer 120 for polarizing the non-polarized lights in one direction to generate polarized lights; a first dichroic mirror 130 for reflecting red light among the polarized lights and transmitting green and blue lights among the polarized lights; a first mirror 140 for totally reflecting the red light reflected by the first dichroic mirror 130; a second dichroic mirror 150 for reflecting/transmitting the green/blue lights transmitted by the first dichroic mirror 130, respectively; second and third mirrors 160a and 160b for totally reflecting successively the blue light transmitted by the second dichroic mirror 150; first, second and third LCD panels 170a, 170b and 170c for selectively transmitting the red light totally reflected by the first mirror 140, the green light reflected by the second dichroic mirror 150 and the blue light reflected totally by the third mirror 160b; and a synthesis prism 180 for synthesizing the red/green/blue lights selectively transmitted by respective panels and outputting the synthesized light.

In the transmissive projector, the polarized light of red light(R), green light (G) and blue light passing through the polarizer 120 from the light source 110 is selectively transmitted or reflected. In other words, the first and second dichroic mirrors 130 and 150 reflect the red light and the green light sequentially, and transmit the remaining blue color. Then, the LCD panels 170a, 170b and 170c selectively transmit the reflected red/green/blue lights. Afterwards, the synthesis prism 180 synthesizes the transmitted red/green/blue lights to thereby obtain desired images.

FIG. 2 is a view showing a conventional three-plate reflective projector. Referring to the FIG. 2, the conventional three-plate reflective projector includes: a light source 210 for applying non-polarized lights; a polarizer 220 for polarizing the non-polarized lights in one direction to generate polarized lights; a first dichroic mirror 230 for reflecting red and green lights among the polarized lights and transmitting blue light among the polarized lights; a second dichroic mirror 250 for reflecting/transmitting the green/red lights reflected by the first dichroic mirror 230, respectively; a mirror 240 for totally reflecting the blue light transmitted by the first dichroic mirror 230; first, second and third polarization beam splitters 260a, 260b and 260c for changing a traveling path of light by reflecting or transmitting the red and green lights separated by the second dichroic mirror 250 and the blue light totally reflected by the mirror 240; first, second and third LCD panels 270a, 270b and 270c for selectively deflecting the red/green/blue lights, which are reflected by the first to third polarization beam splitters, by 90° according to image signals; and a synthesis prism 280 for synthesizing the red/green/blue lights reflected by the respective panels.

According to the conventional projectors constructed as above, a large number of dichroic mirrors, mirrors and polarization beam splitters are used so as to split non-polarized light into the red/green/blue lights and guide them to the respective LCD panels.

In that case, the optical system is complicated and increases in volume, so that it is difficult to downsize the optical system.

In particular, high precision is required since the dichroic mirror and the polarization beam splitter, which are used to construct the conventional projector, influence an entire performance of the projector according to their qualities. Accordingly, there is a limitation when using these optical components since they are expensive.

SUMMARY OF THE INVENTION

An object of the present invention is to provide a projecting display, capable of saving optical components by using a polarization beam splitter having two splitting surfaces and reducing a unit cost of an optical system.

Another object of the present invention is to provide a projection display apparatus capable of making it easier to design lens using improved polarization beam splitter.

To achieve these objects and other advantages and in accordance with the purpose of the invention, as embodied and broadly described herein, a polarization beam splitter comprises: a first splitting surface for transmitting green and blue lights regardless of a P polarized light or an S polarized light, transmitting a red light if the red light is the P polarized light, and reflecting the red light if the red light is the S polarized light; and a second splitting surface for transmitting the green and blue lights if the green and blue lights are the P polarized lights, reflecting the green and blue lights if the green and blue lights are the S polarized lights, and transmitting the red light regardless of the P polarized light or the S polarized light. The first splitting surface is formed in a diagonal direction from one side of a first incident surface upon which the red light is incident. The second splitting surface is formed in a diagonal direction from one side of a second incident surface upon which the green and blue lights are incident.

In accordance with another preferred embodiment of the present invention, a polarization beam splitter comprises: a first splitting surface for transmitting green and blue lights regardless of a P polarized light or an S polarized light, transmitting a red light if the red light is the P polarized light, and reflecting the red light if the red light is the S polarized light; and a second splitting surface for reflecting the green and blue lights if the green and blue lights are the P polarized light, transmitting the green and blue lights if the green and blue lights are the S polarized light, and transmitting the red light regardless of the P polarized light or the S polarized light.

In accordance with further another preferred embodiment of the present invention, a projection display apparatus comprises: a light source for applying a non-polarized light; a polarizer for polarizing the non-polarized light in one direction to generate polarized lights; a dichroic mirror for reflecting a red light among the polarized lights and transmitting green and blue lights among the polarized lights; a mirror for changing a traveling path of the red light reflected by the dichroic mirror; a polarization state converter for selectively converting polarization states of the green and blue lights transmitted by the dichroic mirror; an LCD panel for displaying images corresponding to the red/green/blue lights; a polarization beam splitter for selectively transmitting or reflecting the lights according to the polarization states of lights provided from the mirror and the polarization state converter, and synthesizing lights containing the images provided from the LCD panel; and a projection lens for magnifying and projecting the synthesized images outputted from the polarization beam splitter on screen.

The polarization state converter converts the green light into the S polarized light and the blue light into the P polarized light.

If an image signal is inputted, the LCD panel is a reflective panel that changes the phases of the respective lights by 90° and reflects the changed lights.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
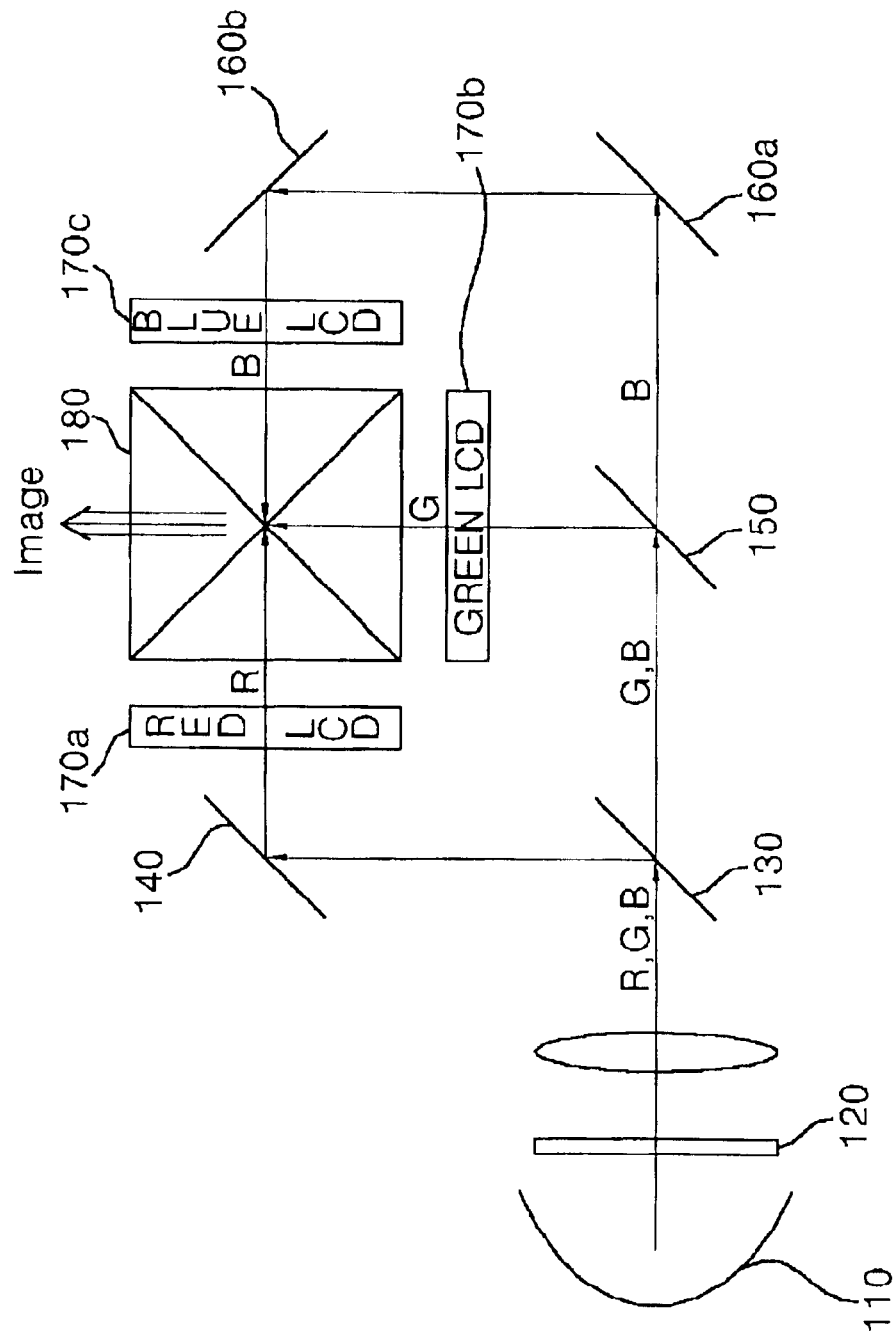
FIG. 1 is a view a conventional three-plate transmissive projector.
Figure 2:
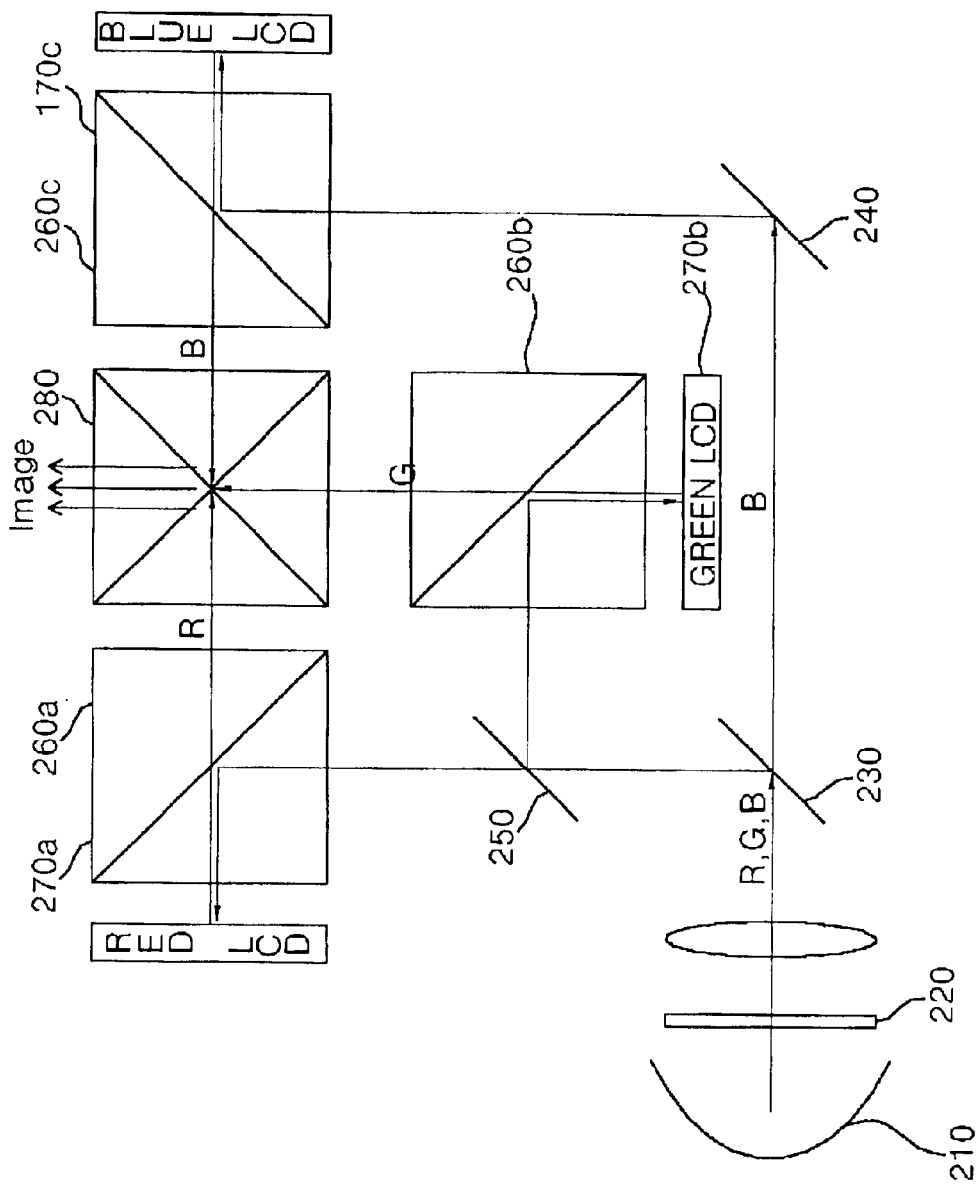
FIG. 2 is a view of a conventional three-plate reflective projector.
Figure 3:
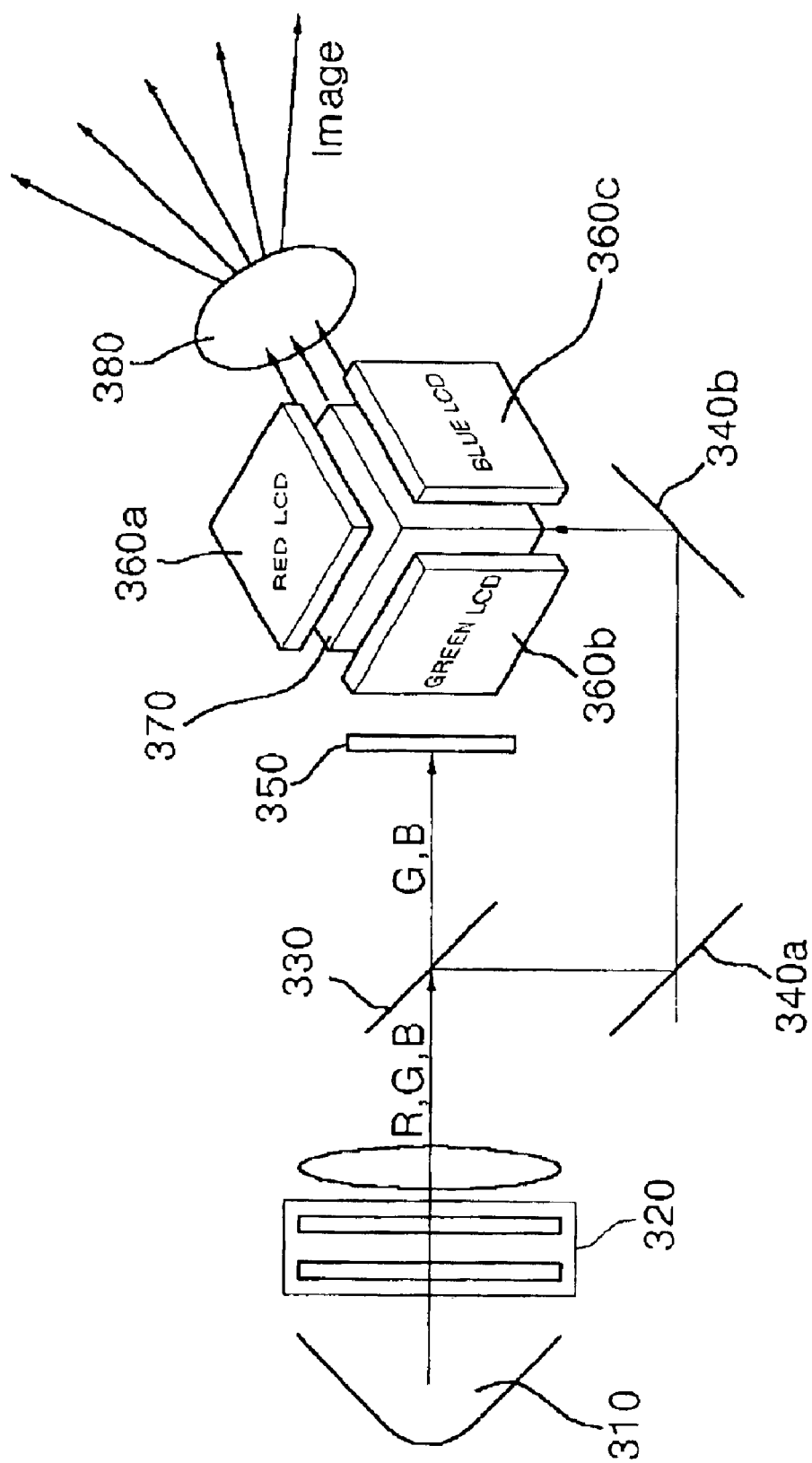
FIG. 3 is a view of a three-plate reflective projector in accordance with a preferred embodiment of the present invention.

FIG. 3 is a view of a three-plate reflective projector in accordance with a preferred embodiment of the present invention. Referring to FIG. 3, the projection display apparatus of the present invention includes: a light source 310 for applying non-polarized lights; a polarizer 320 for polarizing the non-polarized lights in one direction to generate polarized lights; a dichroic mirror 330 for reflecting red light among the polarized lights and transmitting green and blue lights among the polarized lights; mirrors 340a and 340b for changing a traveling path of the red light reflected by the dichroic mirror 330; a color select 350 for selectively converting polarization states of the green and blue lights transmitted by the dichroic mirror 330; LCD panels 360a, 360b and 360c for displaying images corresponding to the red/green/blue lights; a polarization beam splitter 370 for selectively transmitting or reflecting the lights according to the polarization states of lights provided from the mirror and the color select, and synthesizing lights containing the images provided from the LCD panels; and a projection lens 380 for magnifying and projecting the synthesized images outputted from the polarization beam splitter 370 on screen.

The polarizer 320 receives the non-polarized light irradiated from the light source 310 and generates a P polarized light having a polarization in one direction. Of course, the polarize 320 can also generate an S polarized light from the non-polarized light. However, for the sake of convenience in explanation, it is assumed that the polarizer 320 generates the P polarized light.

The dichroic mirror 330 reflects only the red light among the polarized lights and transmits the green and blue lights without any reflection.

The color select 350 converts the green light into the S polarized light and converts the blue light into the P polarized light.

The mirrors 340a and 340b are members for changing the traveling path of the red light and provided with the first mirror 340a and the second mirror 340b.

The LCD panels 360a, 360b and 360c include three LCD panels, i.e., the red LCD panel 360a, the green LCD panel 360b and the blue LCD panel 360c. In this case, the polarization beam splitter 370 is interposed between the green LCD panel 360b and the blue LCD panel 360c. The green LCD panel 360b and the blue LCD panel 360c are located at a rear surface or a side surface of the polarization beam splitter 370 so that they can face the color select 350. The blue LCD panel 360c is located at the rear surface of the polarization beam splitter 370 so that the LCD panel 360C can face the second mirror 340b.

If image signals are inputted, the LCD panels 360a, 360b and 360c change the respective lights by 90° and reflect the changed lights. In other words, the lights are reflected or transmitted by the polarization beam splitter 370 and incident upon the LCD panels 360a, 360b and 360c. Then, when the image signals are inputted into the LCD panels, phases of the applied lights are changed by 90° and then reflected.

Figure 4:
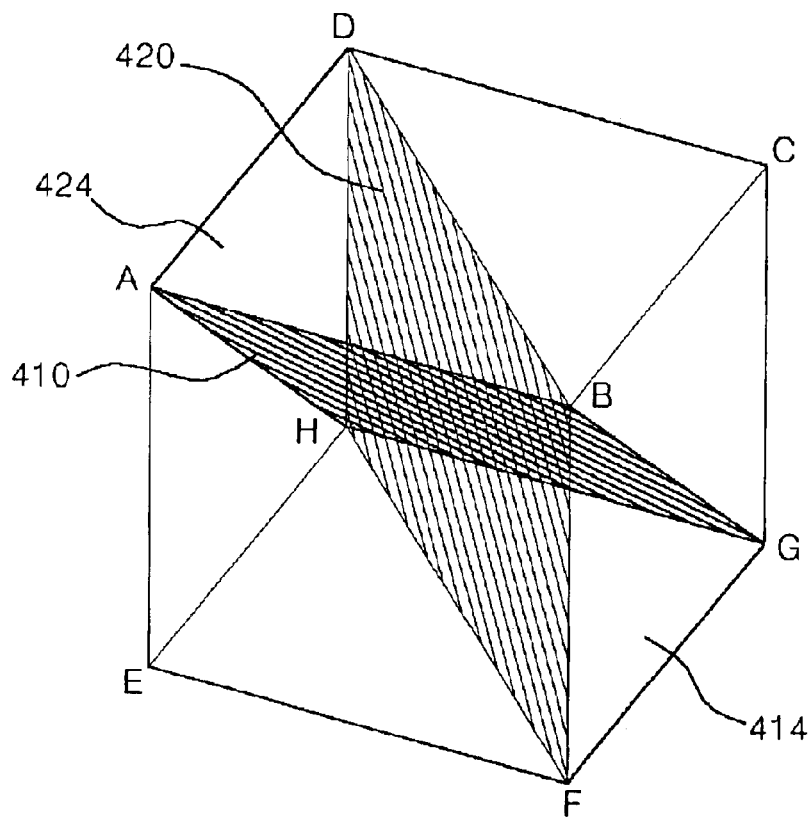
FIG. 4 is a view showing a structure of a polarization beam splitter having two splitting surfaces in a reflective projector in accordance with a preferred embodiment of the present invention.
Figure 5:
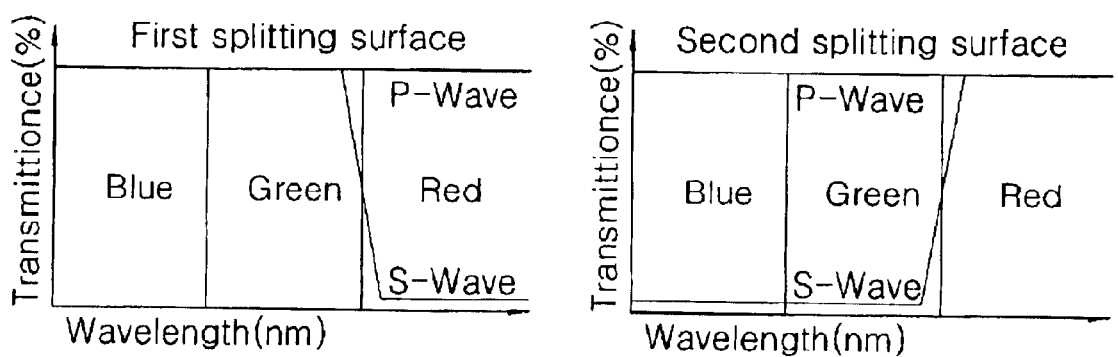
FIG. 5 shows a transmittance of respective lights in the polarization beam splitter in accordance with a preferred embodiment of the present invention.

As shown in FIG. 4, the polarization beam splitter 370 includes two splitting surface, i.e., a first splitting surface 410 and a second splitting surface 420. In other words, in the polarization beam splitter 370, the first splitting surface 410 transmits the green and blue lights regardless of the S polarized light or the P polarized lights. Meanwhile, in case of the red light, the first splitting surface 410 transmits the red light if the red light is the P polarized light and reflects the red light if the red light is the S polarized light. The second splitting surface 420 transmits the green and blue lights if they are the P polarized light and reflects the green and blue lights if they are the S polarized light. Meanwhile, in case of the red light, the second splitting surface 420 transmits the red light regardless of the S polarized light or the P polarized light. At this time, the green LCD panel 360b is located at the side surface of the polarization beam splitter 370 and the blue LCD panel 360c is located at the rear surface of the polarization beam splitter 370. This optical characteristic of the polarization beam splitter 370 can be easily understood with reference to FIG. 5. In other words, in case of the red light, the first splitting surface 410 transmits the P polarized light and reflects the S polarized light. In case of the green and blue lights, the second splitting surface 420 transmits the P polarized light and reflects the S polarized light.

Here, the first splitting surface 410 is formed in a diagonal direction from one side of a first incident surface 414 into which the red light is incident, and the second splitting surface 420 is formed in a diagonal direction from one side of a second incident surface 424 in which the green and blue lights are incident. In other words, the first splitting surface 410 is an area consisting of A-B-G-H and the second splitting surface 420 is an area consisting of B-D-H-F.

Alternatively, the polarization beam splitter 370 can be provided with two splitting surfaces in another manner. In other words, in the polarization beam splitter 370, the first splitting surface 410 transmits the green and blue lights regardless of the P polarized light or the S polarized light while it transmits the red light if the red light is the P polarized light and reflects the red light if the red light is the S polarized light. The second splitting surface 420 reflects the green and blue lights if they are the P polarized light and transmits the green and blue lights if they are the S polarized light while it transmits the red light regardless of the S polarized light or the P polarized light. At this time, the green LCD panel 360b is located at the rear surface of the polarization beam splitter 370 and the blue LCD panel 360c is located at the side surface of the polarization beam splitter 370.

A more detailed description on the polarization beam splitter 370 will be made with reference to FIGS. 6, 7, and 8.

Figure 6:
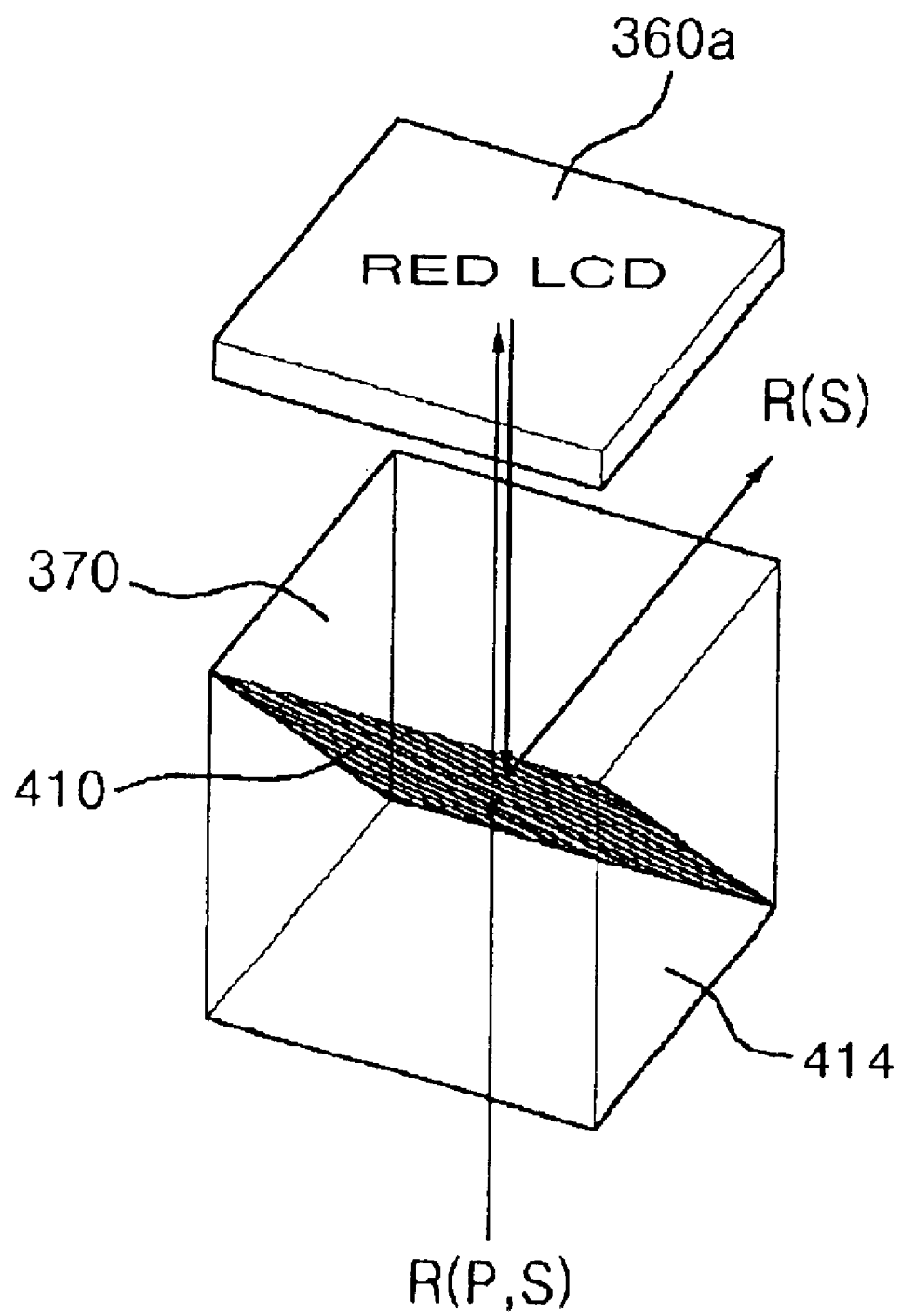
FIG. 6 is a view explaining a characteristic of the first splitting surface into which the red light is irradiated in the reflective projector in accordance with a preferred embodiment of the present invention.

FIG. 6 is a view explaining a characteristic of the first splitting surface upon which the red light is incident in the reflective projector in accordance with a preferred embodiment of the present invention. As shown in FIG. 6, the red light totally reflected by the second mirror 340b is incident upon the first splitting surface 410 through the first incident surface 414 of the polarization beam splitter 370. At this time, the first splitting surface 410 transmits or reflects the red light according to the P polarized light or the S polarized light. In other words, if the red light incident upon the first splitting surface 410 is the P polarized light, the red light is transmitted and then incident to the red LCD panel 360a. On the contrary, if the red light incident upon the first splitting surface 410 is the S polarized light, the red light is reflected.

Meanwhile, if the red light that is the P polarized light is incident to the red LCD panel 360a, the red LCD panel 360a changes a phase of the red light by 90° and the red light is again incident to the polarization beam splitter 370. At this time, the red light that is the P polarized light is converted into the S polarized light by the red LCD panel 360a. The red light that is converted into the S polarized light and again incident is reflected by the first splitting surface 410 and irradiated to the projection lens 380.

Figure 7:
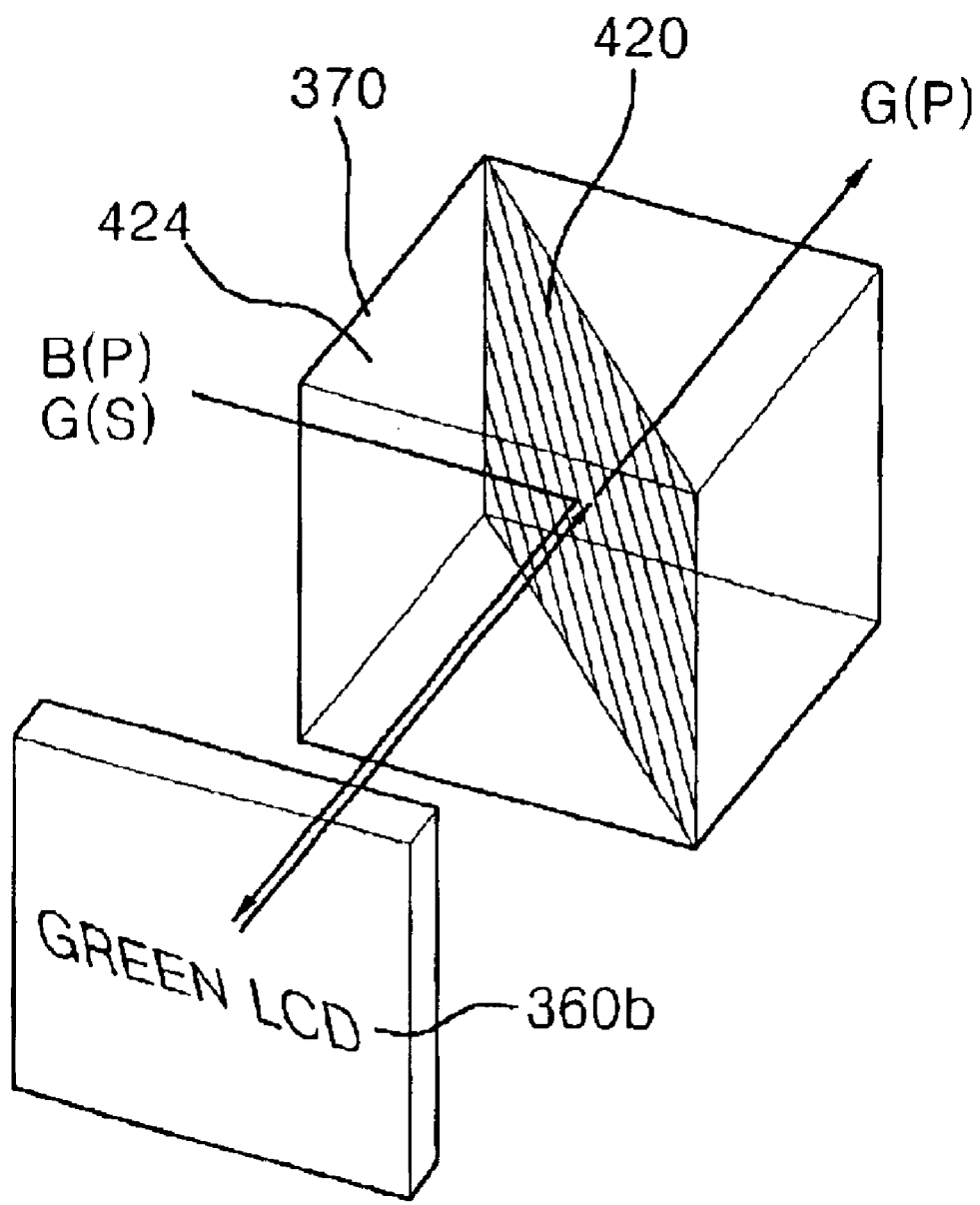
FIG. 7 is a view explaining a characteristic of the second splitting surface into which the green light is irradiated in the reflective projector in accordance with a preferred embodiment of the present invention.

FIG. 7 is a view explaining a characteristic of the second splitting surface into which the green light is irradiated in the reflective projector in accordance with a preferred embodiment of the present invention. As shown in FIG. 7, the green light and the blue light are converted into the S polarized light and the P polarized light by the color selector 350, respectively. Then, the converted green and blue lights are incident to the second incident surface 420 of the polarization beam splitter 370. Here, as described above, the second splitting surface 424 transmits the green and blue lights if they are the P polarized lights and reflects them if they are the S polarized lights.

Accordingly, the green light that is the S polarized light and incident upon the second splitting surface 420 is reflected to be incident to the green LCD panel 360b. The green light is converted into the P polarized light by the green LCD panel 360c and again incident to the polarization beam splitter Since the green light that is again incident is the P polarized light, the green light is transmitted by the second splitting surface 420 and outputted to the projection lens 380.

Figure 8:
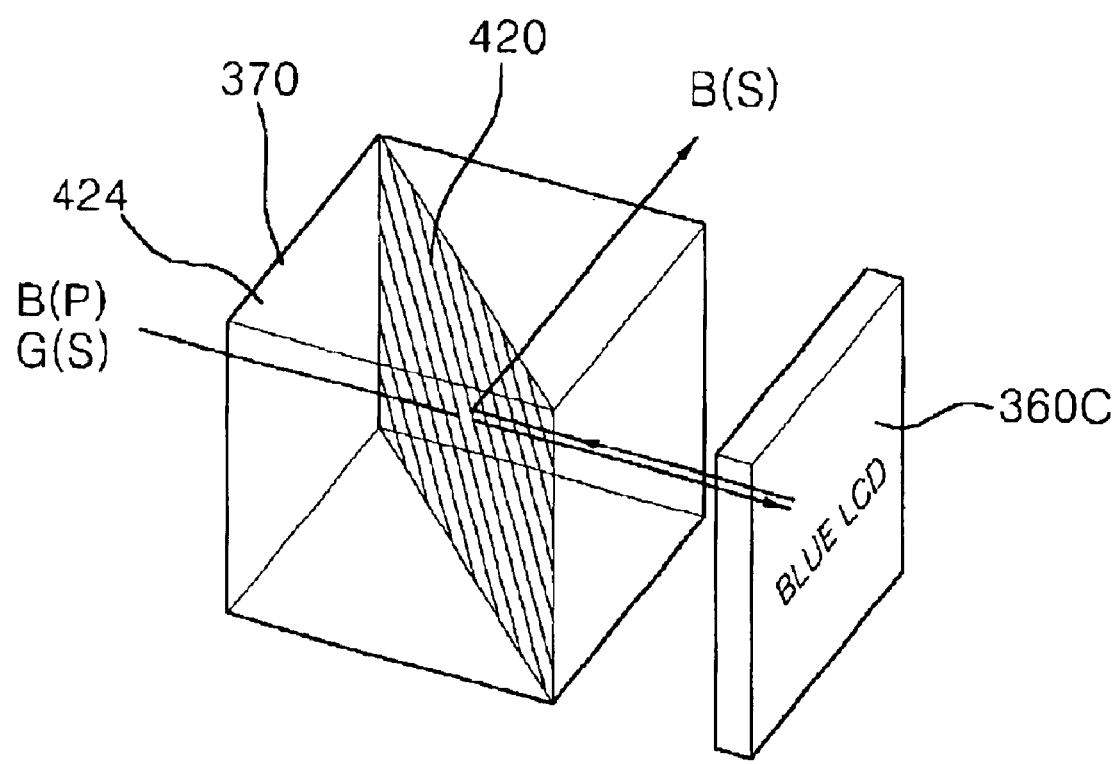
FIG. 8 is a view explaining a characteristic of the second splitting surface into which the blue light is irradiated in the reflective projector in accordance with a preferred embodiment of the present invention.

FIG. 8 is a view explaining a characteristic of the second splitting surface upon which the blue light is incident in the reflective projector in accordance with a preferred embodiment of the present invention. As shown in FIG. 8, the blue light that is converted into the P polarized light by the color select 350 is transmitted by the second splitting surface 420 and incident to the blue LCD panel 360c. The blue LCD panel 360c converts the P polarized blue light into the S polarized light and the converted blue light is again incident to the polarization beam splitter 370. Since the blue light that is again incident to the polarization beam splitter 370 is the S polarized light, the blue light is reflected by the second splitting 420 and irradiated to the projection lens 380.

Hereinafter, an operation of the reflective projector constructed as above will be described.

First, a non-polarized light is irradiated from the light source 310 and incident to the polarizer 320. The polarizer 320 generates the P polarized lights of one direction from the non-polarized light and the P polarized lights are incident to the dichroic mirror 330. Among the P polarized lights, the dichroic mirror 330 reflects the red light and transmits the green and blue lights. The reflected red light is incident to the first mirror 340a, and the green and blue lights are incident to the color select 350.

The green light of the P polarized light incident to the color select 350 is converted into that of the S polarized light. Meanwhile, the blue light of the P polarized light is incident to the polarization beam splitter 370 without any conversion.

Meanwhile, the red light incident to the first mirror 340a is totally reflected to be incident to the second mirror 340b. Then, the red light is again totally reflected by the second mirror 340b and incident to the polarization beam splitter 370. Here, the first and second mirrors 340a and 340b are members for changing the traveling paths of the lights so as to guide the red light to the polarization beam splitter 370.

The polarization beam splitter 370 reflects the green light incident from the color select 350 to apply it to the corresponding green LCD panel 360b, and transmits the blue light to apply it to the corresponding blue LCD panel 360c. Additionally, the polarization beam splitter 370 transmits the red light incident from the second mirror 340b to apply the red light to the corresponding red LCD panel 360a.

As described above, the lights incident from the polarization beam splitter 370 to the corresponding panels, that is, the green/blue/red lights are converted into different polarized lights and again incident to the polarization beam splitter 370. In other words, the green light of the S polarized light is converted into that of the P polarized light by the green LCD panel 360b, and the blue light of the P polarized light is converted into that of the S polarized light by the blue LCD panel 360c. The red light of the P polarized light is converted into that of the S polarized red light by the red LCD panel 360a.

Accordingly, the polarization beam splitter 370 transmits the green light that is again incident as the P polarized light, and applies it to the projection lens 380. The polarization beam splitter 370 reflects the blue and red lights that are again incident as the S polarized lights, and applies them to the projection lens 380. These green/blue/red lights that are applied to the projection lens 380 are focused on the screen by the projection lens 380.

As described above, the projector in accordance with the present invention applies the respective lights to the corresponding LCD panels using the polarization beam splitter having two splitting surfaces. Then, the projector synthesizes the respective reflected lights and makes images.

Since the projector in accordance with the present invention can replace a large number of the conventional dichroic mirrors and a large number of the conventional polarization beam splitters with only one polarization beam splitter, the structure of the optical system is simplified and the optical system decreases in volume.

As the number of the used optical components is greatly decreased, the cost can be reduced and the system can be also downsized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A polarization beam splitter comprising:
    a first splitting surface for transmitting green and blue lights regardless of whether the green and blue lights are P polarized lights or S polarized lights, transmitting a red light if the red light is a P polarized light, and reflecting the red light if the red light is an S polarized light; and
    a second splitting surface for transmitting the green and blue lights if the green and blue lights are P polarized lights, reflecting the green and blue lights if the green and blue lights are S polarized lights, and transmitting the red light regardless of whether the red light is a P polarized light or an S polarized light.

2. The polarization beam splitter according to claim 1, wherein the first splitting surface is formed in a diagonal direction from one side of a first incident surface upon which the red light is incident.

3. The polarization beam splitter according to claim 1, wherein the second splitting surface is formed in a diagonal direction from one side of a second incident surface upon which the green and blue lights are incident.

4. A polarization beam splitter comprising:
    a first splitting surface for transmitting green and blue lights regardless of whether the green and blue lights are P polarized lights or S polarized lights, transmitting a red light if the red light is a P polarized light, and reflecting the red light if the red light is an S polarized light; and
    a second splitting surface for reflecting the green and blue lights if the green and blue lights are P polarized lights, transmitting the green and blue lights if the green and blue lights are S polarized lights, and transmitting the red light regardless of whether the red light is a P polarized light or an S polarized light.

5. The polarization beam splitter according to claim 4, wherein the first splitting surface is formed in a diagonal direction from one side of a first incident surface upon which the red light is incident.

6. The polarization beam splitter according to claim 4, wherein the second splitting surface is formed in a diagonal direction from one side of a second incident surface upon which the green and blue lights are incident.

7. A projection display apparatus comprising:
    a light source for applying a non-polarized light;
    a polarizer for polarizing the non-polarized light in one direction to generate polarized lights;
    a dichroic mirror for reflecting a red light among the polarized lights and transmitting green and blue lights among the polarized lights;
    a mirror for changing a traveling path of the red light reflected by the dichroic mirror;
    a polarization state converter for selectively converting polarization states of the green and blue lights transmitted by the dichroic mirror;
    a plurality of LCD panels for displaying images corresponding to the red, green, and blue lights, respectively;
    a polarization beam splitter for selectively transmitting or reflecting the lights according to the polarization states of lights provided from the mirror and the polarization state converter, and synthesizing lights containing the images provided from the LCD panels; and
    a projection lens for magnifying and projecting the synthesized images outputted from the polarization beam splitter on screen.

8. The projection display apparatus according to claim 7, wherein the polarization state converter converts the green light into an S polarized light.

9. The projection display apparatus according to claim 7, wherein the polarization state converter converts the blue light into a P polarized light.

10. The projection display apparatus according to claim 7, wherein the LCD panels are reflective panels that change phases of the respective lights by 90° and then reflect the resultant lights when an image signal is inputted.

11. The projection display apparatus according to claim 7, wherein the polarization beam splitter comprises:
    a first splitting surface for transmitting the green and blue lights regardless of whether the green and blue lights are P polarized lights or S polarized lights, transmitting the red light if the red light is a P polarized light, and reflecting the red light if the red light is an S polarized light; and
    a second splitting surface for transmitting the green and blue lights if the green and blue lights are P polarized lights, reflecting the green and blue lights if the green and blue lights are S polarized lights, and transmitting the red light regardless of whether the red light is a P polarized light or an S polarized light.

12. The projection display apparatus according to claim 7, wherein the polarization beam splitter comprises:
   a first splitting surface for transmitting the green and blue lights regardless of whether the green and blue lights are P polarized lights or S polarized lights, transmitting the red light if the red light is a P polarized light, and reflecting the red light if red light is an S polarized light; and
   a second splitting surface for reflecting the green and blue lights if the green and blue lights are S polarized lights, transmitting the green and blue lights if the green and blue lights are P polarized lights, and transmitting the red light regardless of whether the red light is a P polarized light or an S polarized light.

13. A polarization beam splitter comprising:
   a first splitting surface for transmitting lights of first and second colors regardless of whether the lights of the first and second colors are P polarized lights or S polarized lights, transmitting a light of a third color if the light of the third color is a P polarized light, and reflecting the light of the third color if the light of the third color is an S polarized light; and
   a second splitting surface for transmitting the lights of the first and second colors if the lights of the first and second colors are P polarized lights, reflecting the lights of the first and second colors if the lights of the first and second colors are S polarized lights, and transmitting the light of the third color regardless of whether the light of the third color is a P polarized light or an S polarized light.

14. The polarization beam splitter according to claim 13, wherein the first splitting surface is formed in a diagonal direction from one side of a first incident surface upon which the light of the third color is incident.

15. The polarization beam splitter according to claim 13, wherein the second splitting surface is formed in a diagonal direction from one side of a second incident surface upon which the lights of the first and second colors are incident.

16. A polarization beam splitter comprising:
   a first splitting surface for transmitting lights of first and second colors regardless of whether the lights of the first and second colors are P polarized lights or S polarized lights, transmitting a light of a third color if the light of the third color is a P polarized light, and reflecting the light of the third color if the light of the third color is an S polarized light; and
   a second splitting surface for reflecting the lights of the first and second colors if the lights of the first and second colors are P polarized lights, transmitting the lights of the first and second colors if the lights of the first and second colors are S polarized lights, and transmitting the light of the third color regardless of whether the light of the third color is a P polarized light or an S polarized light.

17. The polarization beam splitter according to claim 16, wherein the second splitting surface is formed in a diagonal direction from one side of a second incident surface upon which the lights of the first and second colors are incident.

* * * * *